(12) United States Patent
Lang et al.

(10) Patent No.: US 6,499,291 B2
(45) Date of Patent: Dec. 31, 2002

(54) APPARATUS AND METHOD FOR MONITORING $NO_X$ STORAGE CATALYTIC CONVERTERS

(75) Inventors: Axel Lang, Wolfenbüttel (DE); Jens Drückhammer, Braunschweig (DE); Frank Schulze, Vordorf (DE)

(73) Assignee: Volkswagen AG (DE)

(*) Notice: Subject to any disclaimer, the term of this patent is extended or adjusted under 35 U.S.C. 154(b) by 0 days.

(21) Appl. No.: 09/854,735

(22) Filed: May 14, 2001

(65) Prior Publication Data
US 2001/0054282 A1 Dec. 27, 2001

Related U.S. Application Data (63) Continuation of application No. PCT/EP99/08379, filed on Nov. 3, 1999.

(30) Foreign Application Priority Data

Nov. 12, 1998 (DE) .................................... 198 52 240

(51) Int. Cl.[7] ................................................. F01N 3/00
(52) U.S. Cl. .............................. 60/277; 60/274; 60/295; 60/297
(58) Field of Search ........................ 60/274, 276, 277, 60/297, 301, 295

(56) References Cited

U.S. PATENT DOCUMENTS

| | | | |
|---|---|---|---|
| 5,426,934 A | | 6/1995 | Hunt et al. .................... 60/276 |
| 5,483,795 A | * | 1/1996 | Katoh et al. ................... 60/276 |
| 5,771,685 A | * | 6/1998 | Hepburn ....................... 60/274 |
| 5,778,666 A | * | 7/1998 | Cullen et al. .................. 60/274 |
| 5,845,487 A | | 12/1998 | Fraenkle et al. ............... 60/274 |
| 5,881,686 A | | 3/1999 | Schmidt .................... 123/41.86 |
| 6,161,378 A | * | 12/2000 | Hanaoka et al. ............... 60/286 |
| 6,173,571 B1 | * | 1/2001 | Kaneko et al. ................ 60/286 |
| 6,199,372 B1 | * | 3/2001 | Wakamoto ..................... 60/274 |

FOREIGN PATENT DOCUMENTS

| | | |
|---|---|---|
| DE | 19511548 | 6/1996 |
| DE | 69304562 | 10/1996 |
| DE | 19744738 | 4/1998 |
| DE | 19736967 | 3/1999 |
| DE | 19830829 | 4/1999 |
| DE | 19755299 | 6/1999 |
| JP | 7166851 | 6/1995 |
| WO | 9845586 | 10/1998 |

* cited by examiner

Primary Examiner—Thomas Denion
Assistant Examiner—Binh Tran
(74) Attorney, Agent, or Firm—Baker Botts LLP (57) ABSTRACT

A method and apparatus is provided for monitoring the operation of a $NO_x$ storage catalytic converter in the exhaust stream of an internal combustion engine. The $NO_x$ content of the gas stream upstream and downstream of the catalytic converter is measured and used to determine storage efficiency. This is compared to a threshold value, and if the threshold value is not met a regeneration process is performed. The storage value is measured after regeneration to determine if the catalytic converter is faulty.

19 Claims, 6 Drawing Sheets

APPARATUS AND METHOD FOR MONITORING $NO_x$ STORAGE CATALYTIC CONVERTERS

This application is a continuation of PCT/EP99/08379 filed Nov. 3, 1999.

BACKGROUND OF INVENTION

The present invention concerns a method and apparatus for monitoring an $NO_x$ storage catalytic converter located downstream of a lean-running internal combustion engine. $NO_x$ storage catalytic converters consist of a conventional 3-way coating that is augmented by an $NO_x$ storage component. Such converters store the nitrogen oxides contained in the exhaust by forming nitrates during lean operation, and convert them into harmless nitrogen during intermittent catalyst regeneration under reducing conditions, during which process the converters are deliberately emptied and regain essentially their full absorption capacity for nitrogen oxides. This capacity decreases continuously with increasing nitrogen oxide loading during the lean phase.

In contrast, the $NO_x$ absorption capacity or storage efficiency of a thermally damaged or poisoned $NO_x$ storage catalytic converter is lower, which is reflected during lean operation in a more rapidly rising $NO_x$ concentration or $NO_x$ mass downstream of the storage catalytic converter, with the result that proper exhaust gas purification is no longer achieved.

Consequently, monitoring processes for verifying the proper functioning of the catalytic converters are of great interest for practical use of $NO_x$ storage catalytic converters. Existing conventional catalytic converter diagnostic procedures, in which the oxygen storage capacity of the catalyst is determined by means of lambda sensors, and is correlated with the catalytic converter throughput and emission characteristics, are not suitable for lean operation. In an operating mode with $\lambda > 1$, which represents the operating mode that determines emissions for future lean mix concepts, oxygen sensors do not produce a usable signal with adequate resolution due to the constant presence of residual oxygen in the exhaust.

The object of the present invention is thus to produce a monitoring or diagnostic method for an $NO_x$ storage catalytic converter located downstream of a lean-running internal combustion engine which permits the reliable and rapid detection of a faulty or poisoned catalyst and a resulting reduction in catalyst activity or storage efficiency, so that proper functioning of the catalytic converter is always ensured. The object also is to produce an exhaust gas purification device for carrying out this method which includes an $NO_x$ storage catalytic converter.

SUMMARY OF THE INVENTION

In the process according to the invention, the $NO_x$ concentrations are measured in the exhaust gas before and after the $NO_x$ storage catalytic converter and are converted into $NO_x$ mass flows. The $NO_x$ storage efficiency, which is the actual quantity of interest, is then calculated from these values and is compared to a threshold value that indicates a storage catalyst that is faulty or no longer adequately functional; if the threshold is not met, a catalyst failure is reported.

However, since a reduction in catalyst activity or storage efficiency can also result from excessively high nitrogen oxide loading and/or reversible sulfur poisoning, for example, it is preferable for at least one $NO_x$ regeneration and/or desulfating to be performed when the threshold is not met and for the storage efficiency to be measured again. Only if the predetermined threshold is not met again after regeneration is irreversible catalyst damage assumed to have occurred, which is then reported as such.

In a preferred embodiment, before and during the catalyst monitoring, conformity with predefined operating conditions is verified, which may include for example verifying the catalyst loading, catalyst temperature and the lambda value, which among other things ensures that the catalyst monitoring is performed only during lean operation and in a temperature range in which the catalyst is active with regard to $NO_x$ storage. Hence the catalyst temperature must preferably lie in a predetermined temperature range, more particularly between 200 and 600° C., which range depends upon the catalyst system used and more particularly upon the catalyst coating. In addition, the $NO_x$ loading of the catalyst must be below a predetermined threshold value, which preferably corresponds to a fully regenerated catalyst. Moreover, the lambda value upstream and/or downstream of the storage catalytic converter must be $>1$, in which case the selection of lean operation preferably must be indicated by a status bit in the engine control system.

In the preferred embodiment if these conditions are not met, catalyst monitoring is not performed, or monitoring that has already begun is terminated or at least interrupted.

At the beginning of the monitoring process, it is preferable to start a timing function on a timer that is compared to a predetermined monitoring or diagnostic time. Once this time is reached, the measured storage efficiency is stored; the number of stored values preferably are counted, and averaged once a predetermined number of stored values has been reached. The averaged value is then finally compared to the aforementioned threshold value.

In a further preferred embodiment, to compensate for the dependency of the storage efficiency on catalyst loading and space velocity, the exhaust gas concentration measured downstream of the $NO_x$ storage catalytic converter and/or the $NO_x$ mass flow determined therefrom, are evaluated or weighted as a function of these two quantities.

The storage efficiency is preferably also weighted with the averaged catalyst temperature determined during the monitoring time, which is determined by temperature sensors arranged upstream and downstream of the storage catalytic converter or is calculated through modeling in an associated control unit.

Another preferred possibility is to measure the $NO_x$ storage efficiency for several different temperatures as a function of the average catalyst temperature and to store it in a characteristic curve or performance graph, from which aged, poisoned or faulty catalysts can be easily detected and reliably diagnosed on the basis of their characteristic changes. The characteristic changes in the performance graph can include a reduction in storage efficiency at specific temperatures, a corresponding change in the average value of the reduction in storage efficiency over a specific temperature range, or a change in the catalyst temperature at which a specific efficiency is achieved.

The lambda value and the $NO_x$ concentration in the exhaust flowing into or out of the $NO_x$ storage catalytic converter are preferably determined by means of multifunction sensors, arranged upstream and/or downstream, which include $NO_x$-sensitive and oxygen-sensitive measurement devices.

An exhaust gas device in accordance with the invention for carrying out this process includes, an $NO_x$ storage catalytic converter with lambda sensors arranged upstream and downstream thereof to determine the oxygen content of the exhaust flowing into and out of the catalytic converter. In addition, $NO_x$ sensors are arranged upstream and downstream of the $NO_x$ storage catalytic converter to determine the $NO_x$ concentrations in the exhaust gas. Alternatively, the $NO_x$ concentration in the exhaust gas flowing in can also be determined by an associated modeling system, so that the upstream $NO_x$ sensor can be omitted.

Preferred embodiments of this exhaust gas purification device include, for example, a temperature sensor arranged upstream and/or downstream or at least one multifunction sensor with an integrated $NO_x$-sensitive and oxygen-sensitive measurement device.

It is advantageous for the sensors that are used to be adapted with respect to zero point drift and characteristic curve offset.

The exhaust gas purification device in accordance with the invention also includes an analysis and/or control unit to analyze the sensor signals and/or control the diagnostic process described above.

Further characteristics and advantages of the process in accordance with the invention and of the exhaust gas purification device in accordance with the invention for performing the process can be found not only in the associated claims—individually and/or in combination—but also in the description below of preferred example embodiments in conjunction with the associated drawings.

BRIEF DESCRIPTION OF THE DRAWINGS

FIG. 1b shows the second half of the flow chart of FIG. 1a.

DESCRIPTION OF THE INVENTION

Figure 1A:
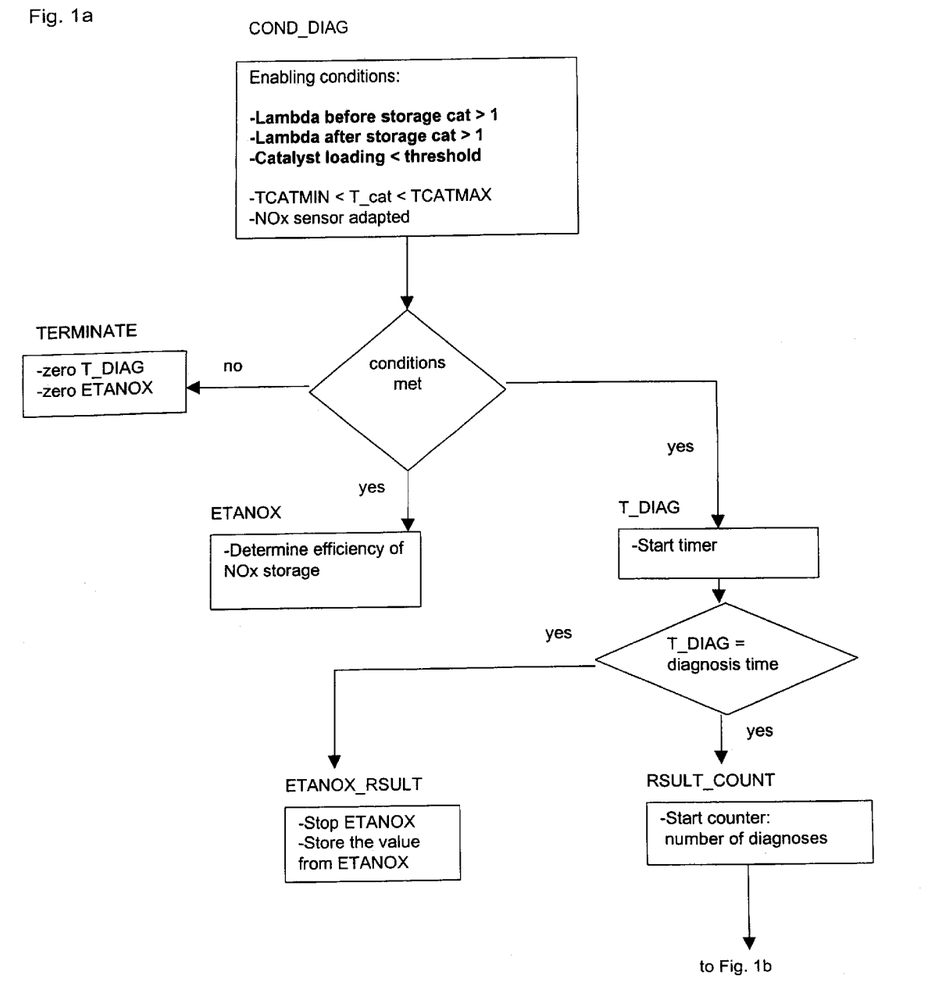
FIG. 1a shows the first half of a flow chart of the process in accordance with the invention.
Figure 1B:
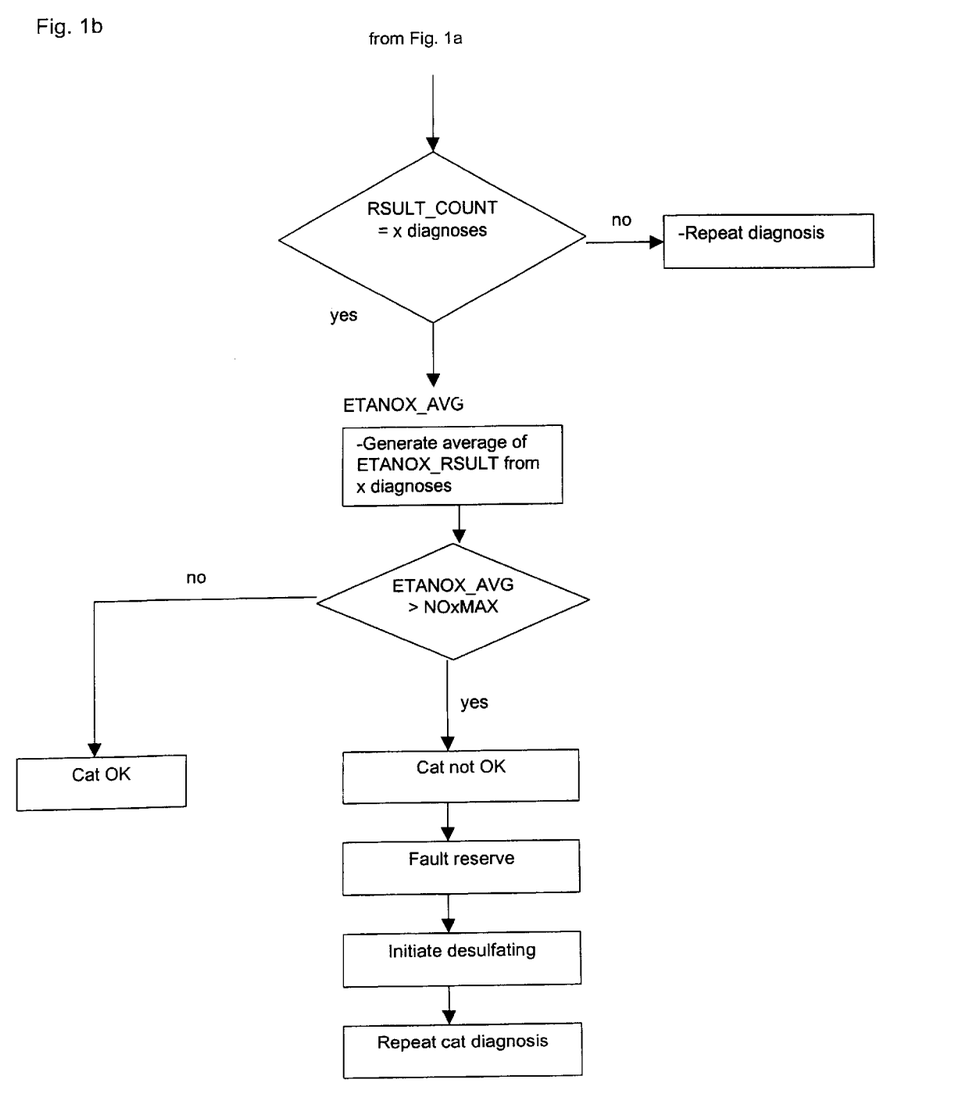

A flow diagram of a method according to a preferred embodiment of the invention for monitoring an $NO_x$ storage catalytic converter downstream of a lean-running internal combustion engine shown in FIGS. 1a and 1b. First the adherence to one or more predefined operating conditions is checked in the COND_DIAG block, ensuring for example, that catalyst monitoring is performed under lean exhaust gas conditions. In particular, this block may check whether the lambda values upstream and downstream of the $NO_x$ catalytic converter are greater than I and whether lean operation is indicated by a status bit in the engine control unit. It is possible, however, that just checking only one of the specified lambda values is sufficient for controlling the process.

In addition, the catalyst temperature T_cat may be required to be within a predefined temperature range TCATMIN<T_cat<TCATMAX in which the catalyst is active for $NO_x$ storage. This temperature range is dependent on the specific catalyst system used, especially upon the catalyst coating. Typically, however, it is between 200 and 600° C.

The temperature and lambda values necessary for performing this monitoring may be determined by appropriate sensors in the manner described in detail below in conjunction with FIG. 5.

The $NO_x$ loading of the storage catalytic converter should be below a predefined loading threshold, which ideally corresponds to a fully regenerated catalyst.

Figure 5:
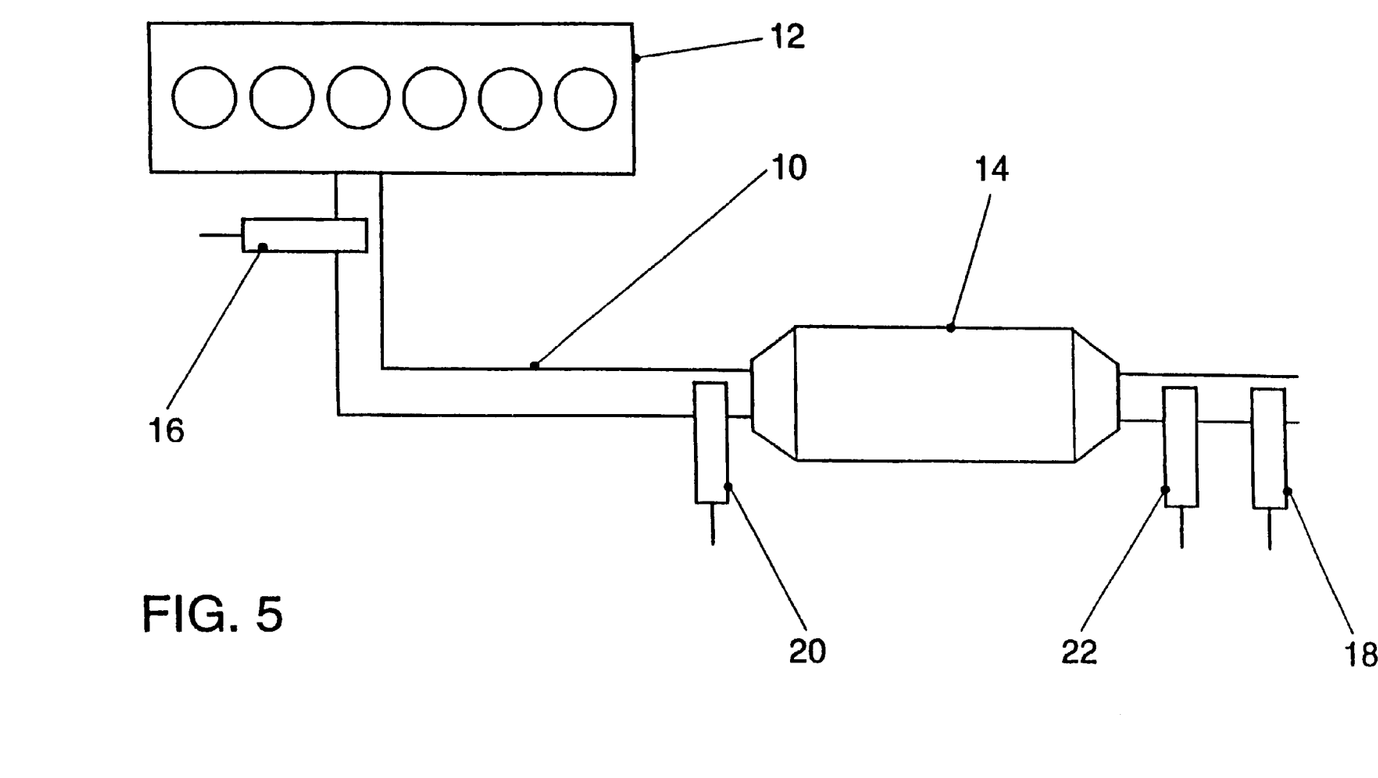
FIG. 5 is a schematic representation of an exhaust gas purification device in accordance with the invention.

Furthermore, a determination may optimally be made as to whether the $NO_x$ sensor or sensors used to determine the storage efficiency, which likewise are in detail below in conjunction with FIG. 5, are adapted with respect to zero point drift and characteristic curve offset.

If the selected required conditions are met, the $NO_x$ storage efficiency ETANOX is determined in the ETANOX block, in the manner described in greater detail below in conjunction with FIG. 2, from the $NO_x$ concentrations upstream and downstream of the $NO_x$ storage catalytic converter which are converted into $NO_x$ mass flows. At the same time, in a preferred embodiment a timing function or a timer T_DIAG is started, which counts the monitoring time or diagnosis time. Once the enabling conditions for the diagnosis have been present for an appropriate applicable period of time, the calculation of the storage efficiency in the ETANOX block is stopped and the diagnostic result is stored in the ETANOX_RSULT block.

If the conditions are not met, the process is not started at all, in which case T_DIAG and ETANOX are set to zero.

To ensure proper catalyst diagnosis, adherence to the conditions specified in the COND_DIAG block may also be continuously checked while the process is being carried out. If the conditions are not met, the monitoring or diagnostic procedure may be terminated early or interrupted.

The number of diagnostic results thus obtained may be counted in the RSULT_COUNT block and compared with a predefined count. If the number is less than this predefined count, a new diagnosis is carried out; otherwise the stored diagnostic results ETANOX_RSULT are averaged. The average catalyst efficiency ETANOX_AVG thus determined is compared to a predefined threshold value $NO_x$-MAX which corresponds to the transition between a faulty catalyst and an adequately functional catalyst. If the calculated average catalyst efficiency ETANOX_AVG is above the predefined threshold value $NO_x$MAX, the catalyst is OK; otherwise, there exists the suspicion of a faulty catalyst.

However, since the activity of the catalyst can also be impaired by excessive nitrogen oxide loading and/or a reversible poisoning, as for example by sulfur, a fault reserve is first set, and at least one desulfating and/or $NO_x$ regeneration is initially performed. The above described diagnostic algorithm is subsequently repeated and the catalyst efficiency is determined again. If the value again falls below the predefined threshold value $NO_x$MAX, the catalyst is assumed to be faulty and a catalyst fault is indicated.

Figure 2:
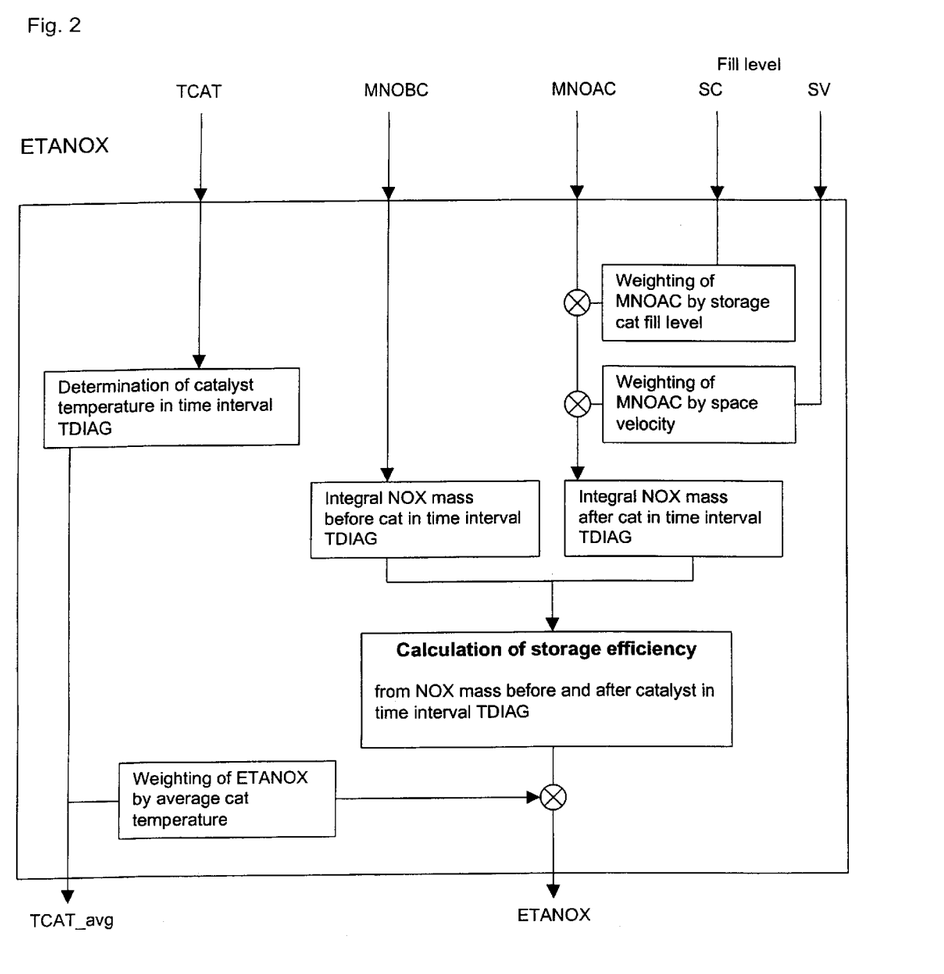
FIG. 2 shows a detailed representation of the ETANOX block from FIG. 1a in which the storage efficiency is determined.
Figure 4:
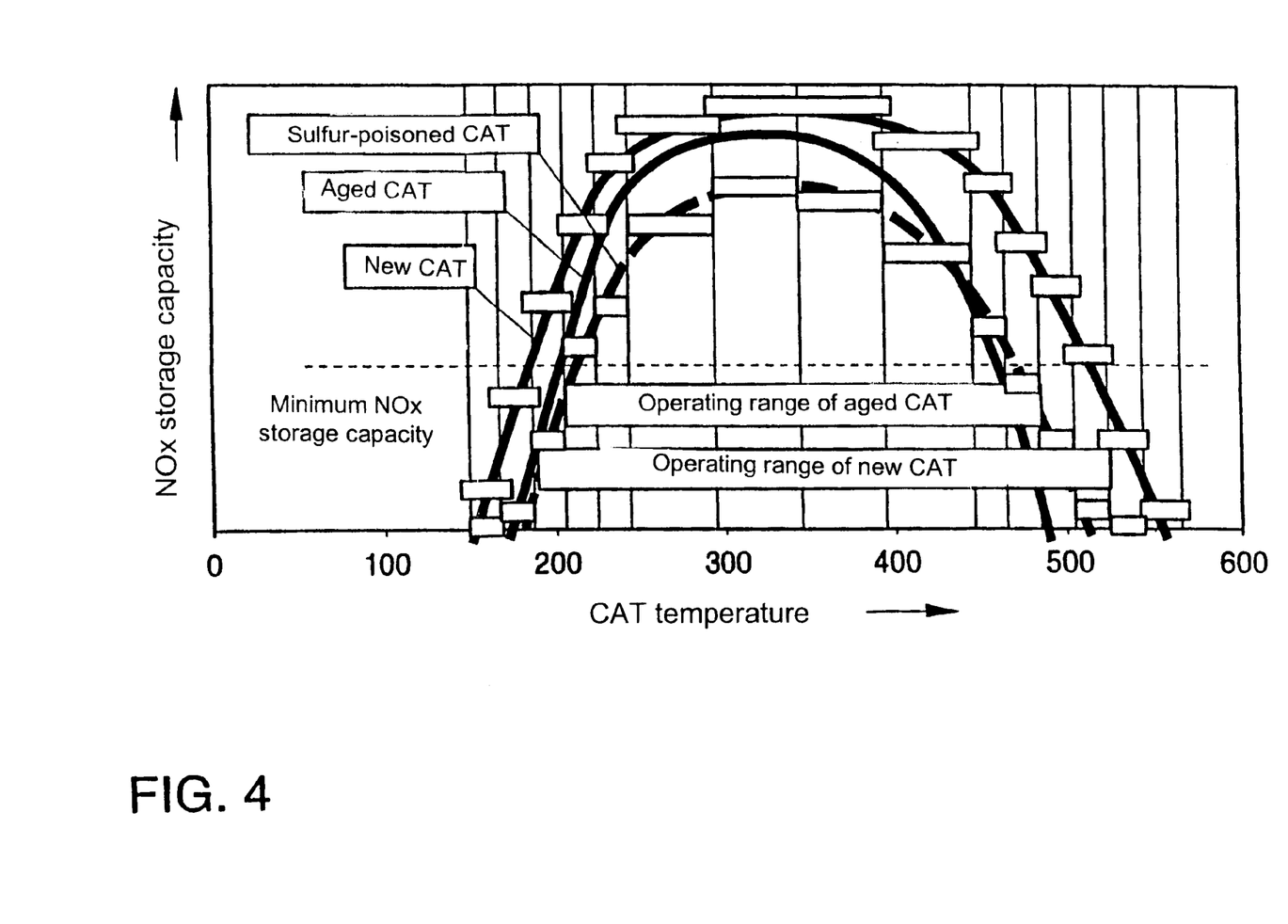
FIG. 4 is a graph showing an example of the dependence of the $NO_x$ storage efficiency on catalyst temperature for a new, an aged, and a sulfur-poisoned $NO_x$ storage catalytic converter.

The actual calculation of the storage efficiency ETANOX may be performed in the aforementioned ETANOX block in FIG. 1a, a preferred arrangement of which is shown again in greater detail in FIG. 2. If the aforementioned preconditions or enabling conditions for performing catalyst monitoring or generating a catalyst diagnosis are met, the $NO_x$ mass flows MNOBC and MNOAC respectively upstream and downstream of the $NO_x$ catalytic converter, which are determined from the $NO_x$ concentrations, are each integrated there over the monitoring or diagnostic interval T_DIAG. Here, the $NO_x$ mass flow MNOAC downstream of the $NO_x$ catalytic converter is evaluated as a function of the storage loading or the storage fill level SC and the space velocity SV, and is weighted appropriately before the integration is performed, since these parameters have a strong influence on the storage rate and thus have a correspondingly strong influence on the $NO_x$ emissions downstream of the $NO_x$ catalytic converter. After the time interval T_DIAG has elapsed, the $NO_x$ storage efficiency in the relevant time interval is calculated from the $NO_x$ mass flows thus obtained and the $NO_x$ mass upstream and downstream of the $NO_x$ storage catalytic converter. Since, as can be seen in FIG. 4, the distinguishability of $NO_x$ storage activity for different states of degradation such as a degradation in activity resulting from temperature aging or sulfur poisoning of the catalyst depends very strongly on temperature, the storage efficiency thus determined in order to determine the actual storage efficiency ETANOX, which is used only for catalyst diagnosis in the manner described above in connection with FIGS. 1a and 1b, is subsequently weighted using the average catalyst temperature TCAT_avg determined over the monitoring or diagnostic period T_DIAG, so that the average catalyst temperature TCAT_avg is preferably taken into account in the evaluation of the storage efficiency ETANOX in accordance with the invention.

Another possible way to account for the influence of the average catalyst temperature TCAT_avg on the $NO_x$ storage efficiency ETANOX is to generate a characteristic curve or a performance graph of the $NO_x$ storage efficiency as a function of the average catalyst temperature TCAT_avg from which aged, faulty or poisoned catalysts can be detected and reliably diagnosed on the basis of their characteristic changes.

Figure 3:
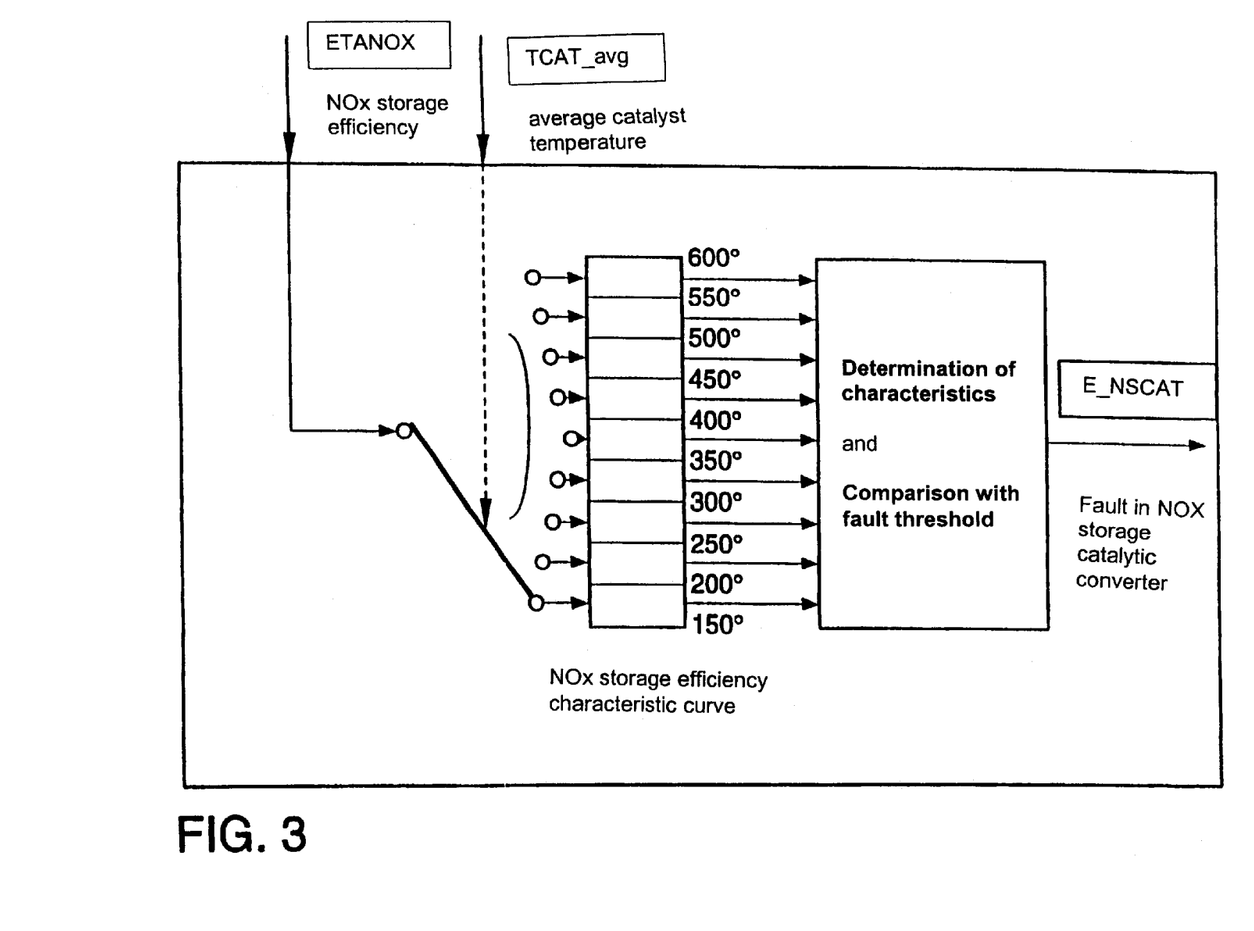
FIG. 3 shows a schematic representation of the analysis/weighting of the $NO_x$ storage efficiency as a function of the average catalyst temperature.

As is shown schematically in FIG. 3, a performance graph can for example be generated here by "distribution" of the $NO_x$ storage efficiencies determined for various catalyst temperatures into different storage cells, each of which is associated with a specific average catalyst temperature. The "distribution" here can be a simple transfer, an averaging, or even an adaptation (as for example incrementing the storage cell if the value in the storage cell is larger than the current value, or decrementing if the value in the storage cell is less than the current value).

Thus, after a certain engine operating time under various operating conditions, which result in different catalyst temperatures, the memory of an associated analysis unit or engine control unit may contain a characteristic curve or a performance graph that embodies the dependence of the storage efficiency on catalyst temperature. As can be seen in FIG. 4, the $NO_x$ storage efficiency of an $NO_x$ storage catalytic converter generally rises sharply at first, then passes through a broad maximum and finally drops off rapidly again. The shape of the curve is strongly influenced by the current operating state of the storage catalytic converter. Thus, the shape of the curve for an aged or poisoned $NO_x$ storage catalytic converter differs in a characteristic way from the new state, which is evident, for example, in a later start of the curve, a lower curve maximum, and an earlier loss of $NO_x$ storage capacity at higher catalyst temperature, so that the operating range determined by the minimum permissible $NO_x$ storage capability of the catalyst becomes correspondingly smaller. Examples of further characteristics that may be evaluated are the reduction of storage efficiency at specific temperatures, a corresponding change in the average value of the decrease in storage efficiency over a specific temperature range, or a change in the catalyst temperature at which a specific efficiency is achieved. These characteristic properties may be determined by the analysis unit or engine control unit and may be compared with predetermined fault thresholds. If these thresholds are not met, a catalyst fault is signaled or excessive sulfur and/or $NO_x$ loading or aging of the catalyst is detected.

FIG. 5 shows a schematic representation of an exhaust gas purification device which is suitable for performing the process according to the invention; this device is arranged in the exhaust line 10 of a lean-running internal combustion engine 12. The exhaust gas purification device includes an $NO_x$ storage catalytic converter 14, which stores the nitrogen oxides emitted by the internal combustion engine 12 during lean operation, and releases them as harmless nitrogen during catalyst regeneration performed intermittently by briefly setting up rich exhaust conditions.

Arranged upstream and downstream of the $NO_x$ storage catalytic converter 14 are lambda sensors 16 and 18 which continuously measure the air ratio in the exhaust flowing into and out of the catalytic converter 14, thereby measuring the corresponding lambda value.

Further, $NO_x$ sensors 20 and 22 can be arranged upstream and downstream of the $NO_x$ storage catalytic converter 14; these sensors measure the concentrations of nitrogen oxides in the exhaust before and after the $NO_x$ storage catalytic converter 14. The $NO_x$ sensors 20 and 22 may be calibrated with respect to zero point drift and characteristic curve offset.

However, the required information on the nitrogen oxide concentration and/or the $NO_x$ mass flow in the exhaust flowing into the catalytic converter 14 may alternately be determined another way, such as through modeling by using a performance graph (engine speed, fuel injection quantity), so that the upstream $NO_x$ sensor 20 is not necessary for carrying out the process according to the invention, and can be omitted in other embodiments of the invention which instead include an appropriate modeling system.

Moreover, it is also possible to integrate the downstream $NO_x$ sensor 22 and the downstream lambda sensor 18 into a multifunction sensor that is capable of measuring the $NO_x$ concentration as well as the oxygen concentration or the air ratio downstream of the $NO_x$ storage catalytic converter 14. This applies in similar fashion to the sensors 16 and 20 upstream of the $NO_x$ storage catalytic converter 14.

Temperature sensors may also be provided (not shown), one of which is located upstream and one downstream of the $NO_x$ storage catalytic converter 14; the requisite catalyst temperature T_cat is determined from their averaged measurements.

The sensor signals are sent to an analysis unit, in which the information necessary for carrying out the process, such as the catalyst temperature T_cat and the $NO_x$ mass streams before and after the catalyst MNOBC and MNOAC, are determined from the measurement results and sent to a control unit (also not shown) for controlling the above-described process according to the invention. The analysis unit and the control unit can be integrated in an engine control unit (not shown) associated with the internal combustion engine (12).

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

We claim:

1. Exhaust gas purification device for a lean-running internal combustion engine comprising
   a) an $NO_x$ storage catalytic converter;
   b) a oxygen contact sensor upstream of the $NO_x$ storage catalytic converter;
   c) an $NO_x$ sensor upstream of the $NO_x$ storage catalytic converter for determining the $NO_x$ concentration in the exhaust flowing into the $NO_x$ storage catalytic converter (14);
   d) an $NO_x$ sensor downstream of the $NO_x$ storage catalytic converter;
   e) an analysis unit for the sensor signals;
   f) a lambda sensor arranged downstream of the $NO_x$ storage catalytic converter; and
   g) a control unit for monitoring operation of said $NO_x$ storage catalytic converter, by carrying out the method of:
      a. determining $NO_x$ exhaust gas concentrations upstream and downstream of said catalytic converter;
      b. determining an $NO_x$ storage efficiency ETANOX from said $NO_x$ exhaust gas concentrations;
      c. comparing said $NO_x$ storage efficiency ETANOX with a threshold value $NO_x$ MAX and determining if said threshold value is not met;
      d. if said threshold value is not met performing at least one regeneration step selected form $NO_x$ regenerating and desulfating;
      e. repeating the determination of storage efficiency according to steps a and b to derive a new value of storage efficiency;
      f. comparing said new value to said threshold value $NO_x$ MAX; and
      g. if said new value does not meet said threshold value, signalizing a catalytic converter fault.

2. Exhaust gas purification device according to claim 1, wherein at least one temperature sensor is provided.

3. Exhaust gas purification device from claim 1, wherein at least one of said sensors is a multifunction sensor that includes at a minimum an $NO_x$-sensitive measurement device and an oxygen-sensitive measurement device.

4. Exhaust gas purification device according to claim 1, wherein at least one of said sensors is adapted for compensating zero point drift and characteristic curve offset.

5. A method for monitoring operation of an $NO_x$ storage catalytic converter in the exhaust stream of a lean running internal combustion engine, comprising
   a. determining $NO_x$ exhaust gas concentrations upstream and downstream of said catalytic converter;
   b. determining an $NO_x$ storage efficiency ETANOX from said $NO_x$ exhaust gas concentrations;
   c. comparing said $NO_x$ storage efficiency ETANOX with a threshold value $NO_x$ MAX and determining if said threshold value is not met;
   d. if said threshold value is not met, setting a fault reserve value and performing at least one regeneration step selected form $NO_x$ regenerating and desulfating;
   e. repeating the determination of storage efficiency according to steps a and b to derive a new value of storage efficiency;
   f. comparing said new value to said threshold value $NO_x$ MAX; and
   g. if said new value does not meet said threshold value and said fault reserve value is set, signalizing a catalytic converter fault.

6. A method according to claim 5, where said monitoring process is only initialed when predefined operating conditions comprising catalyst loading, catalyst temperature $T_{cat}$ and the oxygen content of the exhaust gas, are satisfied before and during the performance of said process.

7. A method according to claim 6, wherein said operating condition for catalyst loading comprises loading below a predefined second threshold value.

8. A method according to claim 7, wherein said regenerating comprises fully regenerating the $NO_x$ storage catalytic.

9. A method according to claim 6, wherein said operating condition for catalyst temperature $T_{cat}$ lies within a predefined temperature range TCATMIN<$T_{cat}$<TCATMAX.

10. A method according to claim 9, wherein said temperature range is 200–600° C.

11. A method according to claim 6, wherein said operating condition for oxygen contact comprises a lambda value >1.

12. A method according to claim 11, wherein said oxygen contact determined by an associated engine control unit.

13. A method according to claim 6, wherein oxygen contact of exhaust gas and $NO_x$ concentration in the exhaust are determined by means of at least one multifunction sensor, which includes an $NO_x$-sensitive measurement device and an oxygen-sensitive measurement device.

14. A method according to claim 5, wherein $NO_x$ exhaust concentrations are measured during the predetermined time intervals, and a resulting value of $NO_x$ storage efficiency ETANOX_RSULT determinated during each time interval is stored.

15. A method according to claim 14, wherein the stored diagnostic results ETANOX_RSULT are counted, and when a predefined number of stored values is reached, an average catalyst efficiency ETANOX_AVG is determined and compared with the initial threshold value $NO_x$MAX.

16. A method according to claim 15, wherein the storage efficiency ETANOX_RSULT is weighted by the average catalyst temperature $T\_{CAT}$ measured during the diagnosis time interval.

17. A method according to claim 5, wherein storage efficiency is determined as a function of the average catalyst temperature $T\_{CAT}$ and values thereof are stored over a period of time, and catalyst fault can be diagnosed on the basis of said store values.

18. A method according to claim 17, wherein characteristic changes to detect catalyst fault are determined from a characteristic selected from reduction in storage efficiency at specific temperatures, a change in the average value of the reduction in storage efficiency over a specific temperature range, and a change in the catalyst temperature at which a specific efficiency is achieved.

19. A method according to claim 5, wherein the $NO_x$ emission concentration or the $NO_x$ mass flow MNOAC downstream of the $NO_x$ storage catalytic converter is weighted as a function of the fill level of the storage catalytic converter and the space velocity SV of exhaust gas flow.

* * * * *